United States Patent
Sun (10) Patent No.: US 11,800,553 B2
(45) Date of Patent: Oct. 24, 2023

(54) DATA PROCESSING METHOD AND APPARATUS, COMMUNICATION DEVICE, AND STORAGE MEDIUM

(71) Applicant: BEIJING XIAOMI MOBILE SOFTWARE CO., LTD., Beijing (CN)

(72) Inventor: Daliang Sun, Beijing (CN)

(73) Assignee: BEIJING XIAOMI MOBILE SOFTWARE CO., LTD, Beijing (CN)

( * ) Notice: Subject to any disclaimer, the term of this patent is extended or adjusted under 35 U.S.C. 154(b) by 0 days.

(21) Appl. No.: 17/334,161

(22) Filed: May 28, 2021

(65) Prior Publication Data

US 2022/0167363 A1    May 26, 2022

(30) Foreign Application Priority Data

Nov. 25, 2020  (CN) .......................... 202011344663.7

(51) Int. Cl.
  *H04W 72/56*  (2023.01)
  *H04L 67/568*  (2022.01)
  *H04L 47/62*  (2022.01)

(52) U.S. Cl.
  CPC ............. *H04W 72/56* (2023.01); *H04L 47/62* (2013.01); *H04L 67/568* (2022.05)

(58) Field of Classification Search
  CPC ..... H04W 72/10; H04W 48/18; H04W 72/06; H04W 72/1242; H04L 47/62; H04L 67/568; H04L 47/24
  See application file for complete search history.

(56) References Cited

U.S. PATENT DOCUMENTS

| | | | |
|---|---|---|---|
| 2020/0177462 A1* | 6/2020 | Jia | H04W 48/12 |
| 2021/0219222 A1* | 7/2021 | Jia | H04W 16/02 |
| 2021/0274512 A1* | 9/2021 | Bisaria | H04W 28/08 |
| 2022/0150118 A1* | 5/2022 | Brown | H04W 40/125 |

FOREIGN PATENT DOCUMENTS

| | | |
|---|---|---|
| AU | 2018314454 A1 | 3/2020 |
| CN | 109391669 A | 2/2019 |

OTHER PUBLICATIONS

Chen Jen-Jee et al:"Realizing Dynamic Network Slice Resource Management based on SDN networks", 2019 International Conference on Intelligent Computing and its Emerging Applications (ICEA), IEEE,Aug. 30, 2019 (Aug. 30, 2019) , pp. 120-125, XP033625929 DOI: 10.1109/ICEA.2019.8858288 [retrieved on Oct. 3, 2019]*paragraph above figure 9;p. 123*, 6 pages.
Supplementary European Search Report in the European application No. 21176733.0, dated Nov. 25, 2021, 9 pages.
CNOA of Application No. 202011344663.7 dated on Jun. 29, 2022 with English translation,(17p).

* cited by examiner

*Primary Examiner* — Jung H Park
(74) *Attorney, Agent, or Firm* — Arch & Lake LLP (57) ABSTRACT

A method, apparatus, and storage medium for data processing are provided. The method includes determining a data priority of data to be transmitted in the communication device. The data priority is a first priority indicating that the data is transmitted by using a network slice, or a second priority indicating that the data is transmitted without using the network slice. The method also includes determining a transmission configuration according to the data priority of the data to be transmitted. The transmission configuration is a first configuration corresponding to the first priority, or a second configuration corresponding to the second priority.

21 Claims, 7 Drawing Sheets

---

S110: a data priority of data to be transmitted in the communication device is determined, where the data priority is a first priority indicating that the data is transmitted by using a network slice, or a second priority indicating that the data is transmitted without using the network slice

↓

S120: a transmission configuration is determined according to the data priority of the data to be transmitted, where the transmission configuration is a first configuration corresponding to the first priority, or a second configuration corresponding to the second priority

↓

S130: the data to be transmitted is transmitted by using a transmission configuration corresponding to a value of the preset identifier of the data to be transmitted

DATA PROCESSING METHOD AND APPARATUS, COMMUNICATION DEVICE, AND STORAGE MEDIUM

CROSS-REFERENCE TO RELATED APPLICATION

This application is based upon and claims priority to Chinese Patent Application No. 202011344663.7 filed on Nov. 25, 2020, the contents of which are hereby incorporated by reference in its entirety for all purposes.

TECHNICAL FIELD

The present disclosure relates to the field of network technologies, and more particularly, to a data processing method and apparatus, a communication device, and a storage medium.

BACKGROUND

Network slicing is an on-demand networking approach that allows an operator to separate multiple virtual end-to-end networks on a unified infrastructure, each network slice is logically isolated from a wireless access device bearer network to a core network, to accommodate various types of data transmission scenarios.

The fifth generation (5th Generation, 5G) mobile communication has two networking modes: Stand Alone (SA) and Non Stand Alone (NSA). Network slicing is more widely used in the Stand Alone. However, in some cases, the transmission rate of the network slice is not as desirable as expected.

SUMMARY

The present disclosure provides a data processing method and apparatus, communication device, and storage medium.

According to a first aspect of the present disclosure, there is provided a method for data processing. The method may include determining a data priority of data to be transmitted in the communication device. The data priority is a first priority indicating that the data is transmitted by using a network slice, or a second priority indicating that the data is transmitted without using the network slice. The method may further include determining a transmission configuration according to the data priority of the data to be transmitted. The transmission configuration is a first configuration corresponding to the first priority, or a second configuration corresponding to the second priority. Transmission of data corresponding to the first configuration from an application layer of the communication device to an access device has a first delay, and transmission of data corresponding to the second configuration from the application layer of the communication device to the access device has a second delay, the first delay being less than the second delay.

According to a second aspect of the present disclosure, there is provided an apparatus. The apparatus may include one or more processors, a non-transitory computer-readable memory storing instructions executable by the one or more processors. The one or more processors may be configured to determine a data priority of data to be transmitted in the communication device, the data priority is a first priority indicating that the data is transmitted by using a network slice, or a second priority indicating that the data is transmitted without using the network slice. The one or more processors may further be configured to determine a transmission configuration according to the data priority of the data to be transmitted. The transmission configuration is a first configuration corresponding to the first priority, or a second configuration corresponding to the second priority. Transmission of data corresponding to the first configuration from an application layer of the communication device to an access device has a first delay, and transmission of data corresponding to the second configuration from the application layer of the communication device to the access device has a second delay, the first delay being less than the second delay.

According to a third aspect of the present disclosure, a non-transitory computer-readable storage medium having stored therein instructions is provided. When the instructions are executed by one or more processors, the instructions may cause the one or more processors to determine a data priority of data to be transmitted in the communication device. The data priority is a first priority indicating that the data is transmitted by using a network slice, or a second priority indicating that the data is transmitted without using the network slice. The instructions may also cause the one or more processors to determine a transmission configuration according to the data priority of the data to be transmitted. The transmission configuration is a first configuration corresponding to the first priority, or a second configuration corresponding to the second priority. Transmission of data corresponding to the first configuration from an application layer of the communication device to an access device has a first delay, and transmission of data corresponding to the second configuration from the application layer of the communication device to the access device has a second delay, the first delay being less than the second delay.

It is to be understood that both the foregoing general description and the following detailed description are example and explanatory only and cannot limit the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

Figure 1:
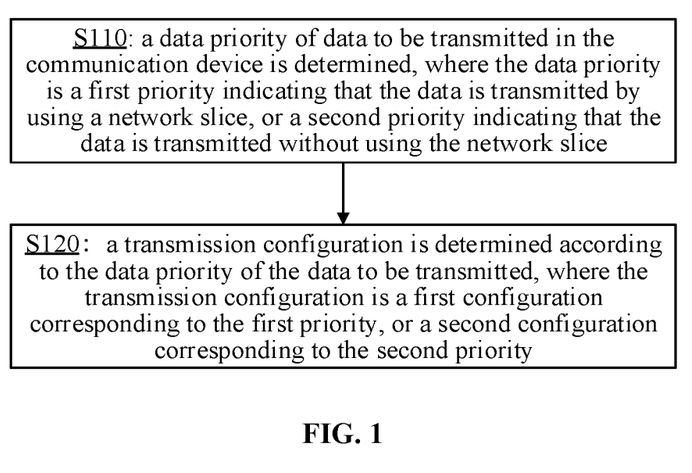
FIG. 1 is a flow chart of a data processing method, according to an example embodiment.

As shown in FIG. 1, an embodiment of the present disclosure provides a data processing method including the following operations S110 to S120.

In operation S110, a data priority of data to be transmitted in the communication device is determined, where the data priority is a first priority indicating that the data is transmitted by using a network slice, or a second priority indicating that the data is transmitted without using the network slice.

In operation S120, a transmission configuration is determined according to the data priority of the data to be transmitted, where the transmission configuration is a first configuration corresponding to the first priority, or a second configuration corresponding to the second priority.

Transmission of data corresponding to the first configuration from an application layer of the communication device to an access device has a first delay, and transmission of data corresponding to the second configuration from the application layer of the communication device to the access device has a second delay, the first delay being less than the second delay. In other words, the first delay caused by the transmission of data corresponding to the first configuration is less than the second delay caused by the transmission of data corresponding to the second configuration.

The method may be applied to various communication devices, which may include a data transmitting end and/or a data receiving end, for example, a terminal and/or a server.

The access device herein may include various communication devices that enable a communication device to be connected to a network, for example, access devices for cellular mobile communication including, but not limited to, a base station; and access devices for WiFi networks including, but not limited to, an Access Point (AP).

Figure 2:
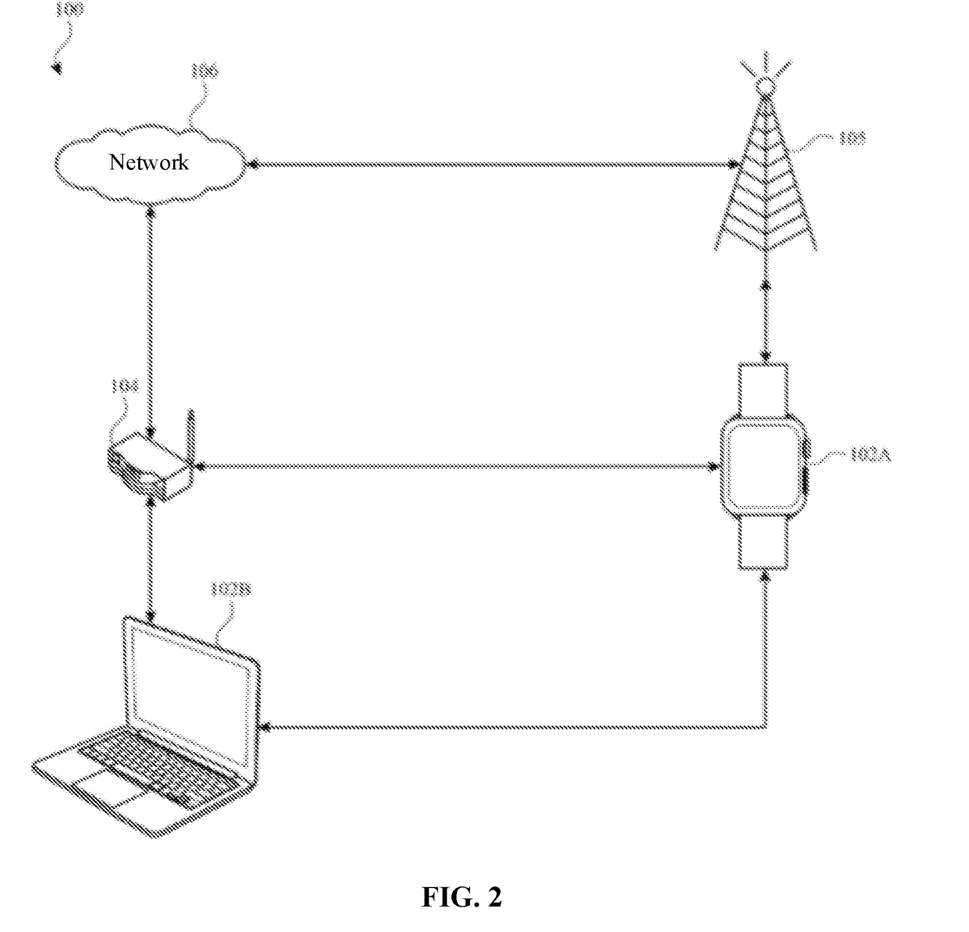
FIG. 2 is a schematic diagram of communication devices connected to a network, according to an example embodiment.

FIG. 2 is a schematic diagram of communication devices connected to a network. The communication devices shown in FIG. 2 include a smart watch 102A and a laptop 102B. The smart watch 102A may be connected to the network 106 through a WiFi access point 104 or to the network 106 through a base station 105 within the network environment 100. The access devices in the figure may include the base station 105 and the WiFi access point 104.

The network slice is a slice starting from the access network, and after the data is accessed to the access device, the data can be transmitted between the access network and/or the core network by using the network slice. In the embodiment of the present disclosure, when transmitting data, the communication device distinguishes between data transmitted using the network slice and data transmitted without using the network slice.

The network slice mentioned in the embodiments of the present disclosure includes a 4G network slice or a 5G network slice, or a next generation network slice.

In the embodiment of the present disclosure, the data priority of the data to be transmitted in the device is divided into a first priority and a second priority.

Specifically, when the data priorities are distinguished, different data priorities are set according to whether the network slice is used for transmission of the data. If the data is transmitted by using the network slice, the data priority of the data is set to the first priority. If the data is not transmitted by using the network slice, the data priority of the data is set to the second priority.

Then, according to the data priority of the data to be transmitted, a transmission configuration is determined for data transmission within the communication device and between the communication device and the access device. Therefore, in the specific embodiment, the operation S120 may include: a first configuration is set for the data to be transmitted according to the first priority, or a second configuration is set for the data to be transmitted according to the second priority.

In an embodiment of the present disclosure, according to the constraints of the transmission configuration on the transmission path, the transmission configuration may include:

a transmission configuration within the communication device; and/or, a transmission configuration between the communication device and the access device.

The first configuration and the second configuration are different. The resource and/or transmission parameters indicated by the first configuration may be such that the delay of the transmission of the data with the first priority in the transmission path within the communication device and between the communication device and the access device is shorter than the delay of the transmission of the data using the second configuration in the transmission path within the communication device and between the communication device and the access device. That is, transmission of the data with the first priority according to the first configuration has a first delay in the transmission path within the communication device and between the communication device and the access device, and transmission of the data with the second priority according to the second configuration has a second delay in a transmission path within the communication device and between the communication device and the access device.

In some embodiments, the transmission parameters further include: an operating frequency of the processor, e.g., the operating frequency of the processor indicated in the first configuration is higher than the operating frequency of the processor indicated in the second configuration.

The similarities and differences between the first configuration and the second configuration may be as follows.

The first configuration and the second configuration have different transmission configurations within the communication device and different transmission configurations from the communication device to the access device; and on the whole, the delay of the transmission of the data corresponding to the first configuration is less than the delay of the transmission of the data corresponding to the second configuration. Exemplarily, compared with the second configuration, the first configuration allocates more resources within the communication device for the transmission of the data, and for the transmission of the data from the communication device to the access device, a link with larger bandwidth or with a better link performance index is selected for the first configuration.

The first configuration and the second configuration have the same transmission configuration within the communication device, but have different transmission configurations from the communication device to the access device; and on the whole, the delay of the transmission of the data corresponding to the first configuration is less than the delay of the transmission of the data corresponding to the second configuration. Exemplarily, compared with the second configuration, a link with a greater bandwidth or with a better link performance index from the communication device to the access device is selected for the first configuration.

The first configuration and the second configuration have different transmission configurations within the communication device, but have the same transmission configuration from the communication device to the access device; and on the whole the delay of the transmission of the data corresponding to the first configuration is less than the delay of the transmission of the data corresponding to the second configuration. Exemplarily, compared with the second configuration, the first configuration allocates more resources within the communication device for transmitting the data.

It should be noted that if there are multiple types of data to be transmitted using different network slices, the first priority can be divided into several sub-priority levels according to the delay required by the network slices. Then, when the transmission configuration is performed, the corresponding transmission configuration is performed according to the sub-priority of the first priority. For example, the network slices are divided into a first slice and a second slice, and it is assumed that the delay required for the first slice is less than the delay required for the second slice. If it is determined that data A is transmitted by using the first slice and data B is transmitted by using the second slice, the first priority is further divided into a first sub-priority corresponding to the data A and a second sub-priority corresponding to the data B. When the transmission configuration is performed, the transmission configuration for the first sub-priority in the first configuration has a less delay than the transmission configuration for the second sub-priority in the second configuration. Thus, not only the differential configuration of the transmission configurations of the data using the network slice and not using the network slice can be realized, but also the differential configuration of the transmission configurations between the data using different network slices can be realized.

In some embodiments, the transmission configuration includes at least one of following configurations: a link configuration, a resource configuration, or a queue priority configuration.

The link configuration indicates a link for transmission of the data from the application layer of the communication device to the access device.

The resource configuration indicates resources for processing and transmitting data.

The queue priority configuration indicates a priority of queue scheduling data in the communication device.

For example, in an embodiment of the present disclosure, the initial provider of data is generally an application layer of the communication device, such as application data provided by an application of the application layer or system data provided by a certain application module of an operating system.

Different transmission links of data have different delays.

The different links herein include different radio frequencies used and/or different transmission paths through the communication device. The different transmission paths through the communication device herein include different virtual network cards of the communication device used, and/or different ports through the physical network card of the communication device, and/or different antennas of the communication device used.

The resource configuration is a configuration of processing and transmission resources, indicating which resources are used for processing and transmission of corresponding data.

The resources configured herein include, but are not limited to, processing resources, where typical processing resources include, but are not limited to, computing resources and/or storage resources. The computing resources may include a Central Processing Unit (CPU) and/or a Graphic Processing Unit (GPU). The storage resources may include, but are not limited to, cache resources.

The queue priority configuration may be one of the foregoing transmission parameters. For example, there is a network interface queue (NIQ) within the communication device, and the network interface queue caches the data that needs to be transmitted from the media framework of the user space to the kernel space. This queue needs to be shared by both data transmitted using the network slice and data transmitted without using the network slice. In embodiments of the present disclosure, the queue priority configuration of the first configuration may cause the data with the first priority to have a higher queue priority than the data with the second priority. The higher the queue priority, the shorter the time that the data stays in the queue, and the data will be transmitted from the NIQ to the underlying hardware as soon as possible and sent from the underlying hardware to outside the network as soon as possible. Alternatively, the network interface queue may transmit the data with high queue priority to the application layer as soon as possible, so that the application layer receives as soon as possible the data transmitted by the peer end using the network slice.

In an embodiment, the operation S120 may include at least one of the following operations.

The link configuration is determined according to the data priority and a link performance index of an alternative link between the communication device and the access device.

Resources of the communication device are scheduled according to the data priority and a resource status in the communication device, to obtain the resource configuration.

A queue priority of the data to be transmitted is configured according to the data priority of the data to be transmitted and a priority of the data in the queue.

In an embodiment of the present disclosure, the first configuration and the second configuration generated according to the data priority of the data to be transmitted have at least one of the following specific characteristics.

The link performance index of the link indicated by the link configuration included in the first configuration is superior to the link performance index of the link indicated by the link configuration included in the second configuration.

The amount of resources indicated by the resource configuration included in the first configuration is greater than the amount of resources indicated by the resource configuration included in the second configuration.

The queue priority indicated by the queue priority configuration included in the first configuration is higher than the queue priority indicated by the queue priority configuration included in the second configuration.

The link performance indexes include, but are not limited to, at least one of the following indexes:

rate, bandwidth, throughput, delay, packet loss rate, signal-to-noise ratio, or Round-Trip Time (RTT).

Rate, bandwidth, throughput and RTT are all positively related to the superiority of the link performance index; and/or, the delay, the packet loss rate and the return time are all negatively related to the superiority of the link performance index.

Herein, the link performance index of the link indicated by the first configuration is superior to the link performance index of the link indicated by the second configuration, that is, the superiority of the link performance index of the link indicated by the first configuration is higher than the superiority of the link performance index of the link indicated by the second configuration.

In an embodiment, the fact that the amount of resources indicated by the resource configuration included in the first configuration is greater than the amount of resources indicated by the resource configuration included in the second configuration may include:
- a number of CPU cores indicated by the first configuration is greater than a number of CPU cores indicated by the second configuration;
and/or,
- a number of threads indicated by the first configuration is greater than a number of threads indicated by the second configuration;
and or,
- a capacity of the cache space indicated by the first configuration is greater than a capacity of the cache space indicated by the second configuration.

The fact that the queue priority indicated by the queue priority configuration included in the first configuration is superior than the queue priority indicated by the queue priority configuration included in the second configuration may include:
- a queue priority indicated by the queue priority configuration included in the first configuration is at least one level higher than the queue priority indicated by the queue priority configuration included in the second configuration. Exemplarily, the queue priority configuration included in the first configuration can uniformly configure the queue configuration priority of the data with the first priority to the highest queue priority.

Specifically, the link configuration includes at least one of:
- a network card configuration indicating a virtual network card used by the link;
- a frequency band configuration indicating a frequency band used by the link; or
- a communication scheme configuration indicating a communication scheme adopted by the link.

In a communication terminal, one or more physical network cards are usually virtualized into multiple virtual network cards, so that different data transmissions can be separated through the virtual network cards.

For example, multiple virtual network cards are configured for a modem, and the link configuration includes the network card configuration.

The frequency band configuration indicates a frequency band used by the link, for example, a 2.4 GHz frequency band and a 5.1 GHz frequency band are used for WiFi communication, the frequency of the wireless signal used by the currently link can be indicated through the frequency band configuration. As another example, for cellular mobile communications, the frequency band configuration may indicate which one of multiple frequency bands supported by cellular mobile communications is currently being used, for example, a licensed frequency band or an unlicensed frequency band, and specifically which Bandwidth Part (BWP) may be specifically indicated, for example.

As to the communication scheme configuration, for example, a terminal supports frequency division multiplexing and/or time division multiplexing, then it is indicated which communication scheme is selected for communication. For another example, a terminal supports a duplex communication mode and also a simplex communication mode, then the communication scheme configuration may indicate which communication mode is supported.

The link configuration relates to the configuration of internal transmission links within the communication device, and also relates to the configuration of transmission links from the communication device to the access device. When the transmission link from the communication device to the access device is a radio link, the transmission configuration from the communication device to the access device may be understood as an air interface configuration.

In some embodiments, the resource configuration includes:
- a computing resource configuration indicating a computing resource for processing the data;
and/or,
- a bandwidth resource configuration indicating a bandwidth for transmission of the data;
and/or,
- a cache configuration indicating a cache for caching the data.

The computing resource configuration herein may be referred to in the foregoing embodiments, for example, a number of a CPU cores and/or a number of threads, and the implementation thereof is not limited to these computing resource configurations.

The computing resources indicated by the computing resource configuration may be used for processing such as compression, packet encapsulation and/or packet de-capsulation of data to be transmitted.

In some embodiments, the same link is used, but the transmission rates may be different if the bandwidth configured for a certain type of data is different. The bandwidth configuration may be used to control the bandwidth used by the communication device to transmit data.

The cache configuration includes, but is not limited to, a Transmission Control Protocol (TCP) Buffer Size. The cache configuration may be used for indicating the maximum amount of data that a data cache can cache.

It should be noted that the resource configurations above are merely examples of the resource configuration, and the specific implementation is not limited to any one of the above examples.

In some embodiments, the data may be divided, by taking the application as granularity, into data transmitted by using a network slice and data transmitted without using network slice.

In another embodiment, the data may be divided, by taking the type of the data as granularity, into data transmitted by using the network slice and data transmitted without using the network slice. For example, compared with common communication and/or video entertainment data, the alarm data in relation to public safety and/or personal safety may be automatically identified as the data transmitted by using the network slice, while other data may be the data transmitted without using the network slice.

When taking the application as granularity to divide whether or not the network slice is used to transmit the data, it is possible to first determine the application which performs data transmission by using the network slice, set the data priority of the data transmitted by the application using the network slice to the first priority, and set the data priority of the data transmitted by the application not using the network slice to the second priority.

Therefore, in an embodiment, the operation S110 may include: it is determined that an application having data to be transmitted in the communication device switches from not using the network slice to using the network slice, and a data priority corresponding to the application is increased from the second priority to the first priority.

Thus, when an application transmits data from not using the network slice to using the network slice, and the data priority of the data transmitted by the application is increased from the second priority to the first priority.

In some embodiments, the data to be transmitted and received by the communication terminal has a preset identifier, where the data with the first priority has a preset identifier having a first value, and the data with the second priority has a preset identifier having a second value.

The first value and the second value are different. If the preset identifier includes one bit, two bit values of the bit are the first value and the second value, respectively.

Figure 3:
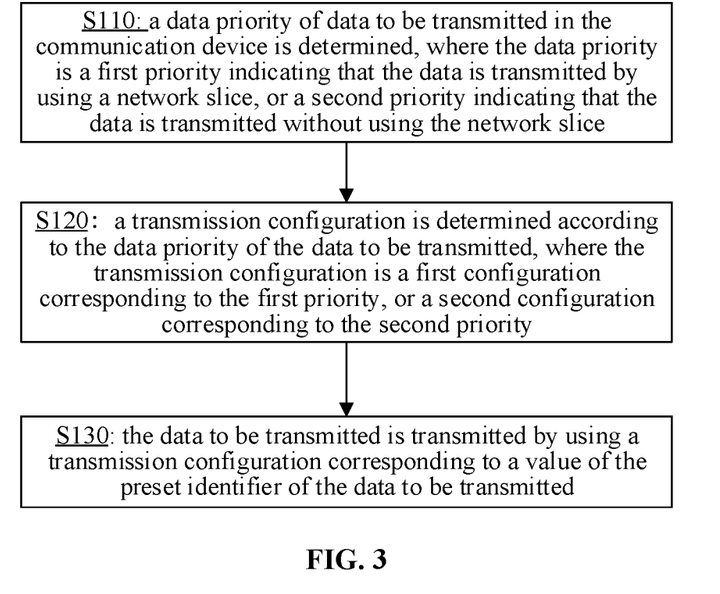
FIG. 3 is a flow chart of a data processing method, according to an example embodiment.

In view of this, in some embodiments, as shown in FIG. 3, the method further includes operation S130.

In operation S130, the data to be transmitted is transmitted by using a transmission configuration corresponding to a value of the preset identifier of the data to be transmitted.

It should be noted that, in the embodiments of the present disclosure, the data transmitted by using the network slice has the preset identifier having the first value, and the data transmitted without using the network slice carries the preset identifier having the second value.

For the case where the communication device is the transmitting end, the operation S130 may include:
the data carrying the preset identifier is received from the application layer;
if the preset identifier has the first value, the data is processed and transmitted according to the first configuration;
if the preset identifier has the second value, the data is processed and transmitted according to the second configuration.

For the case where the communication device is a receiving end, the operation S130 may include:
the data carrying the preset identifier is received from an access device;
if the preset identifier has the first value, the data is transmitted from the underlying hardware of the communication device to the application layer via the middleware layer according to the first configuration;
if the preset identifier has the second value, the data is transmitted from the underlying hardware of the communication device to the application layer via the middleware layer according to the second configuration.

The transmission from the underlying hardware to the application layer via the middleware layer may in turn pass through the modem, the driver, the kernel, and the framework of the communication device until the corresponding Application (App).

In an embodiment, the preset identifier may be an identifier dedicated to indicating the data priority, for example, compared with other related technologies, the preset identifier may be a newly set identifier.

In another embodiment, the preset identifier includes a Type of Service (ToS). The different values of ToS reflect whether the corresponding data is the data transmitted by using the network slice. In the embodiment of the present disclosure, the corresponding data priority is determined according to the ToS, which has the characteristic of strong compatibility with the prior art.

In the related art, a network slice is mainly for an optimization of a communication index of an access network and/or a core network. A network operator constructs an enhanced mobile broadband (eMBB) service, an ultra-reliable low-latency communication (URLLC) service, and a massive Internet of Things (mIoT) service for network nodes such as an access network, a core network and a backbone network, so as to provide a corresponding optimization service for a communication device. However, overall, it is not an end-to-end joint design, and the lack of a coordinated design for an initial "one kilometer" and a final "one kilometer" will reduce the actual effect and affect the overall end-to-end experience. Such an end-to-end overall experience at least includes: the transmission rate is not as high as expected when the data is transmitted by using network slice that only relates to access networks and/or core networks.

Taking a mobile phone as an example of the communication device, when the APP in the mobile phone enables the network slice, for the sliced data flow that uses the network slice for data transmission on the mobile phone, the priority is increased with reference to the data path during the whole process.

The APP server can identify the network slice data flow and increase the data priority in the whole process with reference to the data path call route.

Embodiments of the present disclosure provide a whole process of optimizing overall end-to-end network slice data, the whole process includes: a network slice request is initiated from an APP of a communication terminal, a network slice service is provided by an operator, network slice data is received by an App Server. The priority of the slice data sent from the mobile phone terminal is increased, the APP Server cooperates to increase the priority of receiving the network slice data to form a high data priority relay throughout the end-to-end data path, thereby achieving the optimal end-to-end service experience.

After the mobile phone terminal automatically identifies the requirement that the APP uses the 5G network slice, then the packet transmission priority of the APP is increased. The packet transmission priority herein is one of the forgoing mentioned data priorities. Through the increase of packet transmission priority, when the data transmission configuration is performed based on the packet transmission priority, the following four configurations may be performed.

By measuring and evaluating qualities of transmissions over multiple links, the optimal link is selected to perform packet transmission to improve stability and robustness of the link of the network card used by the sliced data flow.

The queue priority of the network card is increased.

The scheduling of CPU big/little cores is increased.

The TCP Buffer size of the packet transmission is increased.

Taking a terminal performing data transmission as an example, the terminal includes an application layer, a framework, a kernel, a driver, and a modem. The modem will eventually send data through an access device, such as a base station, or receive data from an access device, such as a base station.

Figure 4:
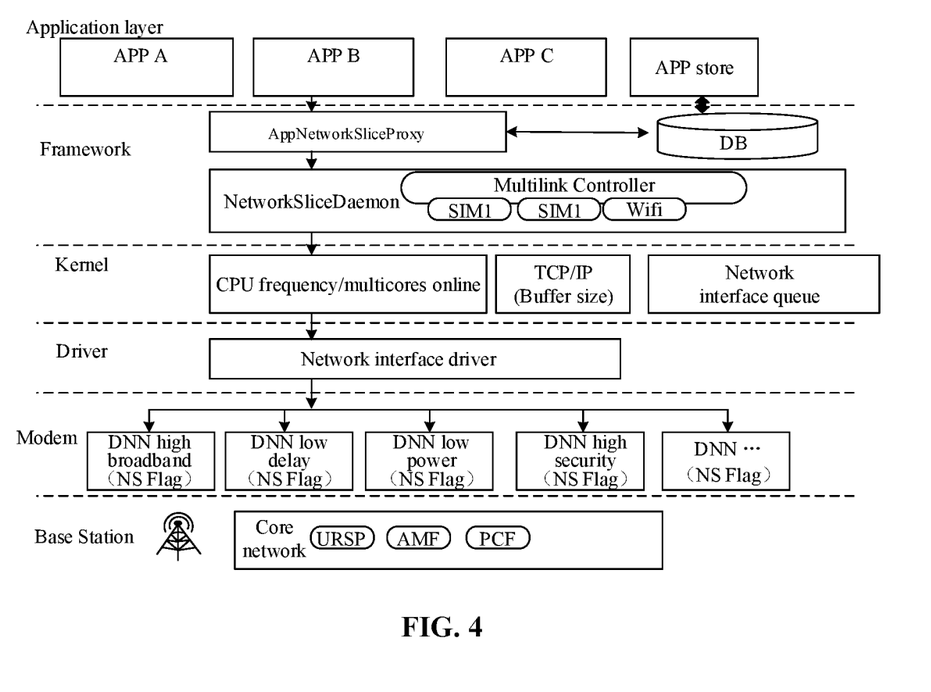
FIG. 4 is a schematic diagram of internal related processing of a terminal, according to an example embodiment.

As shown in FIG. 4, applications such as application A, application B, application C and application store are installed at the application layer.

An AppNetworkSliceProxy is provided within the framework. The AppNetworkSliceProxy knows, according to the records of the database, which applications using network slices for data transmission are installed in the current terminal.

The data to be transmitted formed by the application layer may have a User Identification (UID). If an application transmits data using the network slice, the data of the application will be submitted to the AppNetworkSliceProxy, and the data is mapped to the modem through the AppNetworkSliceProxy, the network slice virtual machine, the resource allocated by the kernel to the network slice, and the network port driver of the driving layer.

If the data of an application is transmitted without using the network slice, the data will not be processed through AppNetworkSliceProxy and the network slice virtual machine, but will be transmitted by using a normal conventional path from the application layer, the middleware layer to the underlying hardware.

There are many types of network slices, and a flag of a Network Slice (NS) is included in a Data Network Name (DNN) configuration after the communication device negotiates with the communication network. After receiving the data transmitted from the AppNetworkSliceProxy, the modem queries the DNN configuration according to information such as the UID of the data, and selects the corresponding network slice for transmission. Network slices having different characteristics are shown in FIG. 4, for example, network slices having high bandwidth, network slices having low delay, network slices having low power consumption, and network slices having high security.

The data is transmitted to the peer end after passing through the network slices of the access network and the core network.

The network elements of the core network include, but are not limited to, functions such as an Access Management Function (AMF) and a Policy Control Function (PCF). The core network also stores the User Equipment Route Selection Policy (URSP).

The mobile phone side notifies the application side (AppServer) of the data flow of the network slice, and then improves the packet receiving priority of the AppServer. Through the increase of packet transmission priority, when the data transmission configuration is performed based on the packet transmission priority, the following four configurations may be performed.

By measuring and evaluating qualities of transmissions over multiple links, the optimal link is selected to perform packet transmission to improve stability and robustness of the link of the network card used by the sliced data flow.

The queue priority of the network card is increased.

The scheduling of CPU big/little cores is increased.

The TCP Buffer size of the packet transmission is increased.

Figure 5:
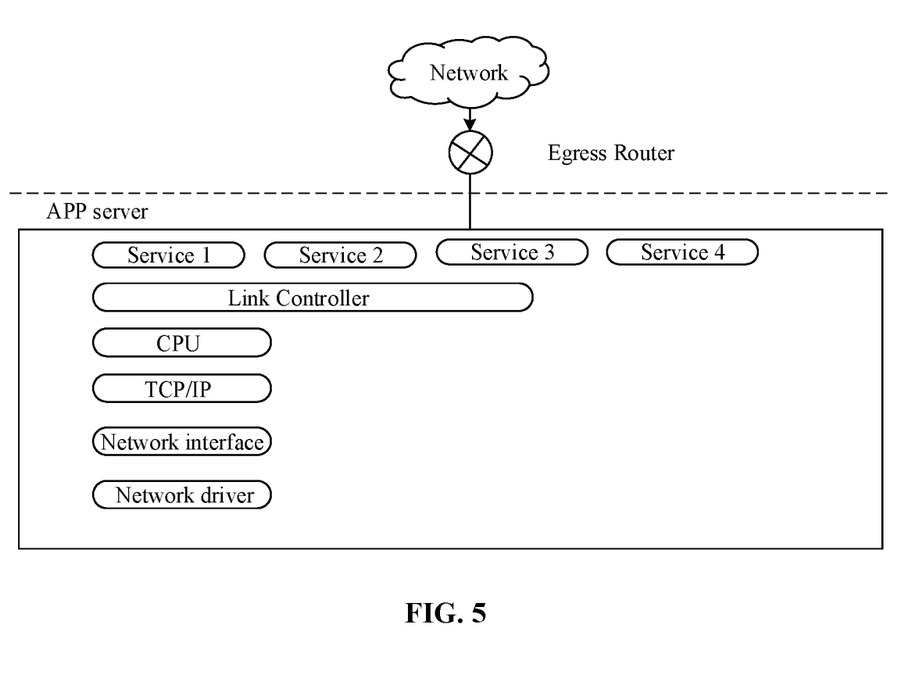
FIG. 5 is a schematic diagram of related processing by a server within a service platform, according to an example embodiment.

FIG. 5 is a schematic diagram of a server performing accelerated transmission of data using the network slice. The network side sends data to the server of the APP through the egress router, or the server sends data to the network through the egress router.

The servers of the APP are subdivided into a server 1, a server 2, a server 3, a server 4, and the like. Similarly, the CPU and the network interface are included in the server, therefore the server may transmit data by using the network slice in a manner similar to that of the terminal.

Figure 6:
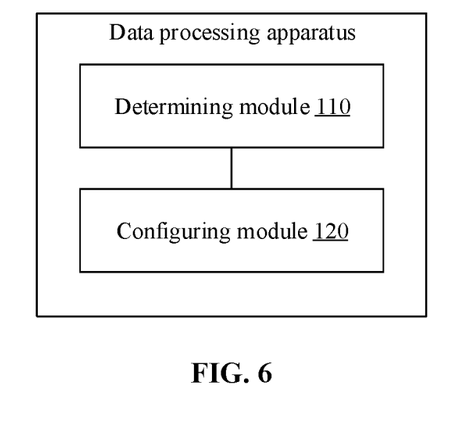
FIG. 6 is a structural diagram of a data processing apparatus, according to an example embodiment.

As shown in FIG. 6, an embodiment of the present disclosure provides a data processing apparatus, applied to a communication device, the apparatus including the following modules 110 and 120.

A determining module 110, configured to determine a data priority of data to be transmitted in the communication device, wherein the data priority is a first priority indicating that the data is transmitted by using a network slice, or a second priority indicating that the data is transmitted without using the network slice.

A configuring module 120, configured to determine a transmission configuration according to the data priority of the data to be transmitted, wherein the transmission configuration is a first configuration corresponding to the first priority, or a second configuration corresponding to the second priority.

Transmission of data corresponding to the first configuration from an application layer of the communication device to an access device has a first delay, and transmission of data corresponding to the second configuration from the application layer of the communication device to the access device has a second delay, the first delay being less than the second delay.

In some embodiments, the determining module 110 and the configuring module 120 may be pure software modules. After being executed by the processor, the pure software modules can intercept the network data and determine which network data belongs to the network data sent by the application to be detected. If the intercepted network data is sent by the application whose network delay is to be detected, a TCP connection is established according to a destination address carried by the intercepted network data, and the network delay is determined through the established TCP connection.

In some embodiments, the determining module 110 and the configuring module 120 may be a combination of hardware and software. The combined module includes, but is not limited to, programmable arrays. The programmable arrays include, but are not limited to, field programmable arrays or complex programmable arrays.

In other embodiments, the determining module 110 and the configuring module 120 may be pure hardware modules, and the pure hardware modules include, but are not limited to, application specific integrated circuits.

In an embodiment, the transmission configuration includes at least one of the following configurations.

A link configuration indicating a link for transmission of the data from the application layer of the communication device to the access device.

A resource configuration indicating resources for processing and transmitting data.

A queue priority configuration indicating a priority of queue scheduling data in the communication device.

In an embodiment, the configuring module 120 is specifically configured to perform at least one of the operations.

The configuring module 120 determines the link configuration according to the data priority and a link performance index of an alternative link between the communication device and the access device.

The configuring module 120 schedules resources of the communication device according to the data priority and a resource status in the communication device to obtain the resource configuration.

The configuring module 120 configures a queue priority of the data to be transmitted according to the data priority of the data to be transmitted and priority of the data in the queue.

In an embodiment, the link configuration includes at least one of the following configurations.

A network card configuration indicating a virtual network card used by the link.

A frequency band configuration indicating a frequency band used by the link.

A communication scheme configuration indicating a communication scheme adopted by the link.

In an embodiment, the resource configuration includes the following configurations.

A computing resource configuration indicating a computing resource for processing the data;

and/or,
a bandwidth resource configuration indicating a bandwidth for transmission of the data;
and/or,
a cache configuration indicating a cache for caching the data.

In an embodiment, the determining module 110 is configured to determine that an application having data to be transmitted in the communication device switches from not using the network slice to using the network slice, and increase a data priority corresponding to the application from the second priority to the first priority.

In an embodiment, the data to be transmitted and received by the communication terminal has a preset identifier, wherein the data with the first priority has a preset identifier having a first value, and the data with the second priority has a preset identifier having a second value.

The apparatus further includes the following module.

A transmitting module, configured to transmit the data to be transmitted by using a transmission configuration corresponding to a value of the preset identifier of the data to be transmitted.

In an embodiment, the preset identifier includes a type of service.

An embodiment of the present disclosure provides a communication device including:
a memory for storing processor-executable instructions;
a processor connected to the memory,
the processor is configured to perform the data processing method provided in any one of the foregoing technical improvements.

The processor may include various types of storage media, which are non-transitory computer storage media, capable of continuing to memorize information stored thereon after the communication device is powered off.

Herein, the communication device includes a base station or a user equipment.

The processor may be connected to the memory via a bus, and the like for reading an executable program stored on the memory, for example, capable of performing at least one of the methods shown in any of FIG. 1 and/or FIG. 3.

As can be seen from the above embodiments, according to the technical improvements provided in the present disclosure, the data transmitted by using the network slice has a higher data priority (i.e., a first priority). Compared with the data transmitted without using the network slice, the transmission of the data transmitted by using the network slice has a short delay from the communication device to the access device, thus when the transmission configuration is based on the first priority, the transmission delay of the data before the data is transmitted by using the network slice of the communication network can be reduced, thereby the overall delay is reduced. Therefore, the transmission delay inside the communication device and the transmission delay between the communication device and the access device can be reduced, thereby the data transmission efficiency is improved.

Figure 7:
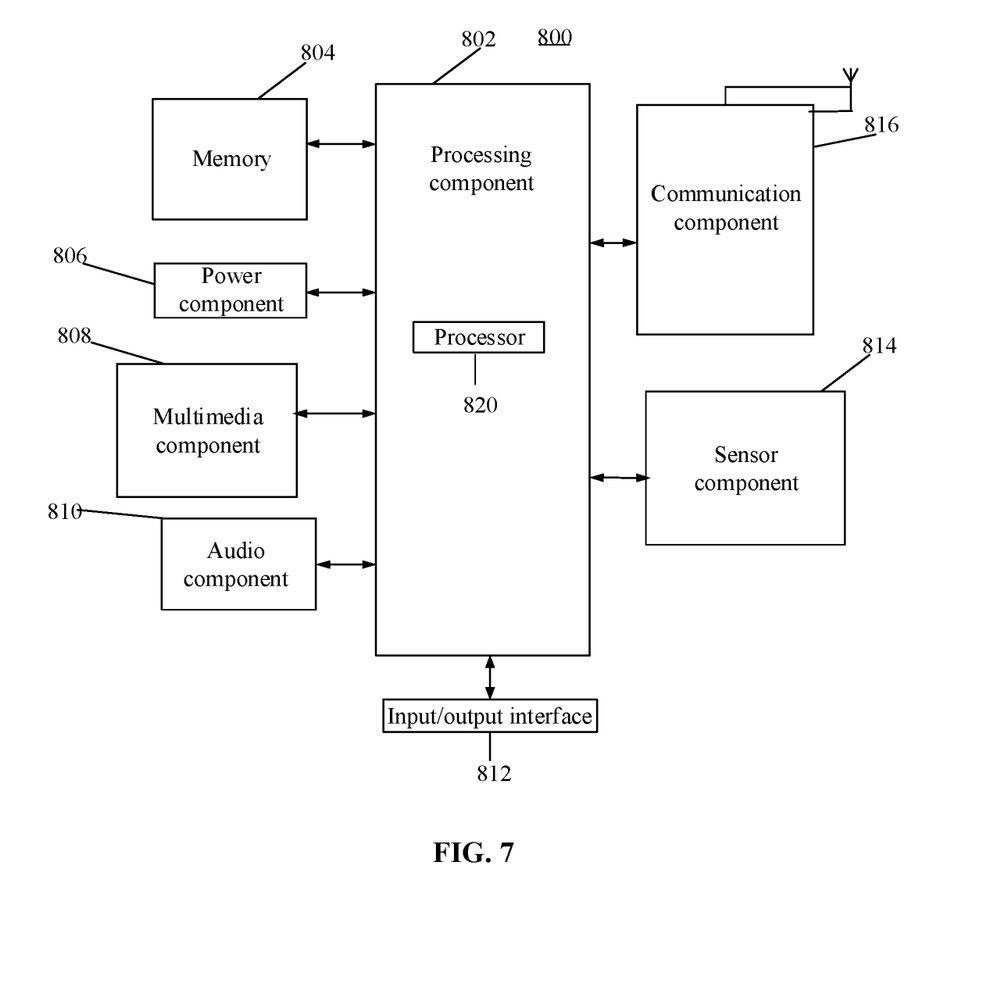
FIG. 7 is a structural diagram of a communication device, according to an example embodiment.

FIG. 7 is a block diagram of a data processing apparatus 800 shown according to an embodiment. For example, the apparatus 800 may be included in a terminal device such as a mobile phone, a mobile computer, or a server, and the like. In general, the data processing apparatus 800 may be included in any communication device.

Referring to FIG. 7, the apparatus 800 may include one or more of the following components: a processing component 802, a memory 804, a power component 806, a multimedia component 508, an audio component 810, an input/output (I/O) interface 812, a sensor component 814, and a communication component 816.

The processing component 802 typically controls overall operations of the device 500, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the device 500, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like.

The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G, or 3G, or a combination thereof. In one or more embodiments, the communication component 816 receives a broadcast signal or broadcast associated information from an external broadcast management system via a broadcast channel. In one or more embodiments, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In one or more embodiments, there is also provided a non-transitory computer readable storage medium including instructions, such as included in the memory 804, executable by the processor 820 in the apparatus 800, for performing the above-described methods. For example, the non-transitory computer-readable storage medium may be a ROM, a CD-ROM, a magnetic tape, a floppy disc, an optical data storage device, and the like.

An embodiment of the present disclosure provides a non-transitory computer-readable storage medium that, when instructions in the storage medium are executed by a processor of a UE, causes the UE to perform the data processing method provided in any of the foregoing embodiments and at least one of the methods shown in any of FIG. 1 and/or FIG. 3.

The data processing method includes: a data priority of data to be transmitted in the communication device is determined, where the data priority is a first priority indicating that the data is transmitted by using a network slice, or a second priority indicating that the data is transmitted without using the network slice;

a transmission configuration is determined according to the data priority of the data to be transmitted, where the transmission configuration is a first configuration corresponding to the first priority, or a second configuration corresponding to the second priority, transmission of data corresponding to the first configuration from an application layer of the communication device to an access device has a first delay, and transmission of data corresponding to the second configuration from the application layer of the communication device to the access device has a second delay, the first delay being less than the second delay.

Exemplarily, the transmission configuration includes at least one of the following configurations.

A link configuration indicating a link for transmission of the data from the application layer of the communication device to the access device.

A resource configuration indicating resources for processing and transmitting data.

A queue priority configuration indicating a priority of queue scheduling data in the communication device.

Exemplarily, herein, the transmission configuration is determined according to the data priority of the data to be transmitted includes at least one of the following operations.

The link configuration is determined according to the data priority and a link performance index of an alternative link between the communication device and the access device.

Resources of the communication device are scheduled, according to the data priority and the resource status in the communication device, to obtain the resource configuration.

A queue priority of the data to be transmitted is configured according to the data priority of the data to be transmitted and priority of the data in the queue.

Exemplarily, the link configuration includes at least one of the following configurations.

A network card configuration indicating a virtual network card used by the link.

A frequency band configuration indicating a frequency band used by the link.

A communication scheme configuration indicating a communication scheme adopted by the link.

Exemplarily, the resource configuration includes the following configurations.

A computing resource configuration indicating a computing resource for processing the data;

and/or, a bandwidth resource configuration indicating a bandwidth for transmission of the data;

and/or, a cache configuration indicating a cache for caching the data.

Exemplarily, the data priority of data to be transmitted in the communication device is determined includes the following operation.

It is determined that an application having data to be transmitted in the communication device switches from not using the network slice to using the network slice, and increases a data priority corresponding to the application from the second priority to the first priority.

Exemplarily, the data to be transmitted and received by the communication terminal has a preset identifier, wherein the data with the first priority has a preset identifier having a first value, and the data with the second priority has a preset identifier having a second value.

The method further includes:
the data to be transmitted is transmitted by using a transmission configuration corresponding to a value of the preset identifier of the data to be transmitted.

Exemplarily, the preset identifier includes type of service.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as examples only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for data processing, comprising:
   determining, by a communication device, a data priority of data to be transmitted in the communication device, wherein the data priority is a first priority indicating that the data is transmitted by using a network slice, or a second priority indicating that the data is transmitted without using the network slice; and
   determining, by the communication device, a transmission configuration according to the data priority of the data to be transmitted, wherein the transmission configuration is a first configuration corresponding to the first priority, or a second configuration corresponding to the second priority,
   wherein transmission of data corresponding to the first configuration from an application layer of the communication device to an access device has a first delay, and transmission of data corresponding to the second configuration from the application layer of the communication device to the access device has a second delay, the first delay being less than the second delay, wherein the transmission from the application layer of the communication device to the access device comprises transmission within the communication device, and transmission between the communication device and the access device.

2. The method of claim 1, wherein the transmission configuration comprises at least one of following configurations:
   a link configuration indicating a link for transmission of the data from the application layer of the communication device to the access device;
   a resource configuration indicating resources for processing and transmitting data; or
   a queue priority configuration indicating a priority of queue scheduling data in the communication device.

3. The method of claim 2, wherein determining the transmission configuration according to the data priority of the data to be transmitted comprises at least one of:
   determining the link configuration according to the data priority and a link performance index of an alternative link between the communication device and the access device;
   scheduling resources of the communication device according to the data priority and a resource status in the communication device to obtain the resource configuration; or
   configuring the queue priority configuration of the data to be transmitted according to the data priority of the data to be transmitted and the priority of the queue scheduling data.

4. The method of claim 2, wherein the link configuration comprises at least one of following configurations:
   a network card configuration indicating a virtual network card used by the link;
   a frequency band configuration indicating a frequency band used by the link; or
   a communication scheme configuration indicating a communication scheme adopted by the link.

5. The method of claim 2, wherein the resource configuration comprises at least one of following configurations:
   a computing resource configuration indicating a computing resource for processing the data;
   a bandwidth resource configuration indicating a bandwidth for transmission of the data; or
   a cache configuration indicating a cache for caching the data.

6. The method of claim 1, wherein determining the data priority of data to be transmitted in the communication device comprises:
   determining that an application having data to be transmitted in the communication device switches from not using the network slice to using the network slice, and increasing a data priority corresponding to the application from the second priority to the first priority.

7. The method of claim 1, wherein the method further comprises:
   transmitting the data to be transmitted by using a transmission configuration corresponding to a value of a preset identifier of the data to be transmitted, wherein the data to be transmitted and received by the communication terminal comprises the preset identifier, wherein the data with the first priority has a first preset identifier having a first value, and the data with the second priority has a second preset identifier having a second value.

8. The method of claim 7, wherein the preset identifier comprises a type of service.

9. The method of claim 1, wherein the first configuration and the second configuration have different transmission configurations within the communication device and different transmission configurations from the communication device to the access device, and the first delay is less than the second delay; or
   the first configuration and the second configuration have a same transmission configuration within the communication device, but have different transmission configurations from the communication device to the access device, and the first delay is less than the second delay; or
   the first configuration and the second configuration have different transmission configurations within the communication device, but have a same transmission configuration from the communication device to the access device, and the first delay is less than the second delay.

10. An apparatus, comprising:
a non-transitory computer-readable storage medium for storing processor-executable instructions; and
one or more processors,
wherein the one or more processors are configured to:
determine a data priority of data to be transmitted in the communication device, wherein the data priority is a first priority indicating that the data is transmitted by using a network slice, or a second priority indicating that the data is transmitted without using the network slice; and
determine a transmission configuration according to the data priority of the data to be transmitted, wherein the transmission configuration is a first configuration corresponding to the first priority, or a second configuration corresponding to the second priority,
wherein transmission of data corresponding to the first configuration from an application layer of the communication device to an access device has a first delay, and transmission of data corresponding to the second configuration from the application layer of the communication device to the access device has a second delay, the first delay being less than the second delay, wherein the transmission from the application layer of the communication device to the access device comprises transmission within the communication device, and transmission between the communication device and the access device.

11. The apparatus of claim 10, wherein the transmission configuration comprises at least one of following configurations:
a link configuration indicating a link for transmission of the data from the application layer of the communication device to the access device;
a resource configuration indicating resources for processing and transmitting data; or
a queue priority configuration indicating a priority of queue scheduling data in the communication device.

12. The apparatus according to claim 11, wherein the one or more processors configured to determine the transmission configuration according to the data priority of the data to be transmitted are further configured to:
determine the link configuration according to the data priority and a link performance index of an alternative link between the communication device and the access device;
schedule resources of the communication device according to the data priority and a resource status in the communication device to obtain the resource configuration; or
configure the queue priority configuration of the data to be transmitted according to the data priority of the data to be transmitted and the priority of the queue scheduling data.

13. The apparatus of claim 11, wherein the link configuration comprises at least one of following configurations:
a network card configuration indicating a virtual network card used by the link;
a frequency band configuration indicating a frequency band used by the link; or
a communication scheme configuration indicating a communication scheme adopted by the link.

14. The apparatus of claim 11, wherein the resource configuration comprises at least one of following configurations:
a computing resource configuration indicating a computing resource for processing the data;
a bandwidth resource configuration indicating a bandwidth for transmission of the data; or
a cache configuration indicating a cache for caching the data.

15. The apparatus of claim 10, wherein the one or more processors configured to determine the data priority of data to be transmitted in the communication device are further configured to:
determine that an application having data to be transmitted in the communication device switches from not using the network slice to using the network slice, and increase a data priority corresponding to the application from the second priority to the first priority.

16. The apparatus of claim 10, wherein the one or more processors are further configured to:
transmit the data to be transmitted by using a transmission configuration corresponding to a value of the preset identifier of the data to be transmitted, wherein the data to be transmitted and received by the communication terminal comprises the preset identifier, wherein the data with the first priority has a first preset identifier having a first value, and the data with the second priority has a second preset identifier having a second value, and.

17. The apparatus of claim 16, wherein the preset identifier comprises a type of service.

18. A non-transitory computer-readable storage medium having stored thereon instructions that, when executed by one or more processors, cause the one or more processors to perform a method for data processing, the method comprising:
determining a data priority of data to be transmitted in the communication device, wherein the data priority is a first priority indicating that the data is transmitted by using a network slice, or a second priority indicating that the data is transmitted without using the network slice; and
determining a transmission configuration according to the data priority of the data to be transmitted, wherein the transmission configuration is a first configuration corresponding to the first priority, or a second configuration corresponding to the second priority,
wherein transmission of data corresponding to the first configuration from an application layer of the communication device to an access device has a first delay, and transmission of data corresponding to the second configuration from the application layer of the communication device to the access device has a second delay, the first delay being less than the second delay, wherein the transmission from the application layer of the communication device to the access device comprises transmission within the communication device, and transmission between the communication device and the access device.

19. The non-transitory computer-readable storage medium of claim 18, wherein the transmission configuration comprises at least one of following configurations:
a link configuration indicating a link for transmission of the data from the application layer of the communication device to the access device;
a resource configuration indicating resources for processing and transmitting data; or
a queue priority configuration indicating a priority of queue scheduling data in the communication device.

20. The non-transitory computer-readable storage medium of claim 19, wherein the instructions further cause the one or more processors to perform at least one of:

determining the link configuration according to the data priority and a link performance index of an alternative link between the communication device and the access device;

scheduling resources of the communication device according to the data priority and a resource status in the communication device to obtain the resource configuration; or configuring the queue priority configuration of the data to be transmitted according to the data priority of the data to be transmitted and the priority of the queue scheduling data.

21. The non-transitory computer-readable storage medium of claim 19, wherein the link configuration comprises at least one of following configurations:

a network card configuration indicating a virtual network card used by the link;

a frequency band configuration indicating a frequency band used by the link; or a communication scheme configuration indicating a communication scheme adopted by the link.

\* \* \* \* \*